United States Patent [19]

McLain, II

[11] Patent Number: 4,839,038
[45] Date of Patent: Jun. 13, 1989

[54] FLUID STRAINER AND FLOW CORRECTOR FOR FLUID MEASUREMENT DEVICE

[75] Inventor: Thomas N. McLain, II, Montgomery, Ala.

[73] Assignee: Schlumberger Industries, Inc., Atlanta, Ga.

[21] Appl. No.: 204,322

[22] Filed: Jun. 9, 1988

[51] Int. Cl.$^4$ .............................................. B01D 35/02
[52] U.S. Cl. ................................. 210/137; 210/447.3; 73/861.91; 73/202
[58] Field of Search ................ 210/87, 91, 137, 497.3; 73/3, 54, 861.81, 861.91, 866.3, 202; 417/63, 313; 55/185, 463, 464; 138/39, 40

[56] References Cited

U.S. PATENT DOCUMENTS

| | | | |
|---|---|---|---|
| 2,601,616 | 6/1952 | Kasten | 210/137 |
| 2,658,625 | 11/1953 | Rafferty | 210/497.3 |
| 3,374,673 | 3/1968 | Trageser | 73/202 |
| 4,473,470 | 9/1984 | Loutit | 210/497.3 |
| 4,522,058 | 6/1985 | Ewing | 73/202 |
| 4,715,234 | 12/1987 | Allen et al. | 73/861.91 |

Primary Examiner—Frank Spear
Assistant Examiner—J. W. Drodge
Attorney, Agent, or Firm—Dale V. Gaudier

[57] ABSTRACT

A fluid strainer and flow corrector for use with a fluid flow measurement device, such as a turbine-type flow meter, consists of a generally conical grid of ribs attached to an annular base flange. The base flange of the strainer/flow corrector fits into a groove formed on the inlet side of the housing of the flow meter and is held in place by means of a flexible snap-ring. The strainer/flow corrector is arranged with its apex upstream of the flange portion with respect to the direction of fluid flow through the inlet of the flow meter. The spacing between the ribs is chosen as to block the flow of debris which might be present in the fluid flowing through the flow meter. The spacing between the ribs is also chosen to provide a desired velocity profile to the fluid. The strainer/flow corrector may be easily removed or replaced without disconnecting the flow meter from its associated pipework.

4 Claims, 2 Drawing Sheet

FLUID STRAINER AND FLOW CORRECTOR FOR FLUID MEASUREMENT DEVICE

BACKGROUND OF THE INVENTION

1. Field of the Invention

The invention relates to the field of fluid flow measuring devices and, more particularly, to a fluid strainer and flow corrector for use with such flow measurement devices.

2. Description of the Prior Art

Fluid flow measuring devices, such as turbine type fluid flow meters, often use strainers and/or flow correction devices arranged ahead of the inlet of the flow meter. Strainers generally take the form of a flat plate of material, such as stainless steel, having a series of regularly spaced openings arranged in a mesh or grid pattern. The size of the openings is arranged to be on the order of or less than the size of the smallest particles or debris which may be present in the fluid which the flow meter is designed to measure. Since the accumulation of debris on the strainer eventually builds up to the point where it must be removed, such straining devices must be mounted in a way which enables them to be readily moved from the flow meter. This is often done by simply bolting the plate-like strainer between a flange provided on the inlet side of the flow meter housing and the pipe or other conduit to which the inlet side of the flow meter is connected. Of course, such an arrangement requires a good compression seal between the inlet flange of the flow meter and the flange of the pipe to which it is connected. Furthermore, the flow meter must be temporarily disconnected from the pipework to allow the strainer to be cleaned or replaced.

It is also known to mount a so-called "strainer box" upstream of the flow meter housing. The strainer box includes a mesh-type strainer element which is removable through a cover provided on the strainer box. This arrangement allows the strainer element to be removed without the need to disassemble the pipework connected to the strainer box and flow meter.

In addition to a debris strainer, fluid flow meters also often employ fluid flow correction devices. Such flow correction devices can take the form of a series of spaced-apart vanes arranged parallel to the diameter of the flow meter inlet, with the vanes being relatively thin and arranged in planes which are parallel to the longitudinal access of the inlet of the flow meter, i.e. substantially parallel to the direction of the fluidflow. Another type of flow correction device is comprised of a bundle of tubes disposed upstream of the flow meter inlet with the longitudinal axis of each such tube arranged parallel to each other and to the direction of fluid flow.

Such fluid flow correction devices are designed to impart a desired velocity profile to the fluid and/or correct swirling (rotation of the fluid about the direction of flow). As is well known, the velocity of the fluid in a tubular conduit or pipe free of obstructions is generally higher in the center of a conduit (i.e. along the longitudinal axis of the conduit) than at points closer to the wall of the conduit. However, for many types of fluid flow meters, such as turbine flow meters, it is desirable to have a substantially uniform fluid flow velocity profile at all points in a plane perpendicular to the longitudinal axis of the conduit. This enables the flow sensing element of the flow meter to give as accurate a reading as possible of the velocity and/or quantity of fluid flowing past the element.

Fluid flow correction devices of the type described above must be mounted upstream of the flow meter inlet and any debris strainer. Such flow correction devices normally require that a straight section of pipe be provided ahead of the flow correction device. The straight length of pipe generally must be at least several pipe diameters long in order to provide non-turbulent fluid flow conditions ahead of the flow corrector to ensure optimum flow correction. This requirement restricts the use of such flow correction devices to environments where such a straight piping run can be provided immediately ahead of the flow meter inlet. Unfortunately, such an arrangement is not always practical due to space limitations, existing piping configurations, etc.

It is also known to utilize a strainer of the flat-plate type described above as a flow correction device. For example, the size and/or spacing of the openings further from the center of the strainer can be made greater relative to those closer to the center of the strainer in order to impart a desired fluid flow velocity profile. However, such devices still require a compression seal between the flow meter inlet flange and the flange of the piping connected to the flow meter, and require that the flow meter be temporarily disconnected from its pipework in order to clean or replace the strainer.

It would be desirable to have a combination strainer and fluid flow corrector which is easy to mount and dismount from the inlet of a flow meter without requiring a special housing or disconnection of the flow meter from its pipework and which does not require long straight piping runs ahead of the inlet, while still providing the desired straining and fluid flow velocity profile correction to the fluid.

SUMMARY OF THE INVENTION

These and other drawbacks of prior art strainers and flow correctors are overcome by the present invention wherein a fluid strainer and flow corrector having grid-like openings is formed in the shape of a blunt-tipped cone which is mounted in the inlet of a fluid flow measuring device. The apex of the cone is disposed upstream of the base portion of the strainer/flow corrector with respect to the direction of fluid flow through the inlet of the fluid flow measuring device.

More particularly, the invention relates to a combination fluid strainer/flow corrector for use with a fluid flow measurement device of the type including a housing having an inlet and outlet connected to a conduit through which the fluid to be measured flows and a fluid measurement element disposed in the housing between the inlet and outlet for measuring a parameter of the fluid. The strainer/flow corrector comprises an annular flange portion and a substantially conical ribbed portion connected to the flange portion. The ribbed portion further comprises a plurality of spaced-apart annular ribs disposed substantially parallel to a plane containing the annular flange portion, the annular ribs being formed having successively smaller diameters at increasing longitudinal distances from the annular flange portion, and a plurality of spaced-apart radial support ribs arranged about and each connected at one end to the annular flange and connected together at their other end at substantially an apex of a cone whose side is defined by the radial support ribs and whose base is defined by the annular flange portion. The fluid strainer/flow corrector is disposed in the inlet of the measurement device housing with the apex disposed upstream of the flange portion with respect to the direction of fluid flow through the inlet.

Preferably, the inlet of the housing has an annular groove formed therein for receiving the annular flange portion of the strainer/flow corrector, and further includes a removable annular ring (e.g. a flexible snap-ring) arranged in the groove adjacent to the annular flange portion of the strainer/flow corrector for holding the flange portion of the strainer/flow corrector in the groove.

The spacing between the annular ribs and radial support ribs is chosen to be no greater than the size of debris that might be present in the fluid. This prevents debris from flowing through the flow meter housing and possibly damaging or disturbing the flow measurement element. Furthermore, the spacing between the annular ribs and radial support ribs and the thickness of the annular ribs and the radial support ribs is chosen to provide a desired velocity profile to fluid flowing past the fluid strainer/flow corrector. For example, the annular ribs may be arranged equidistant from each other. However, when viewed face-on (i.e. in a plane perpendicular to the longitudinal axis of the strainer/flow corrector) the effective size of the openings between the annular ribs and radial support ribs will be less closer to the apex of the strainer/flow corrector (i.e. closer to the longitudinal axis of the strainer/flow corrector), than for those openings which are more radially and longitudinally distant from the apex. This arrangement provides the required correction to the fluid velocity profile so as to reduce the velocity of the fluid moving closer to the longitudinal axis of the inlet of the flow meter relative to the velocity of the fluid moving nearer the inlet wall. In addition, the radial support ribs act to correct any swirling present in the fluid.

The use of a flexible snap-ring for securing the flange portion of the strainer/flow corrector to the groove formed in the inlet of the housing enables the strainer/flow corrector to be readily mounted and/or removed from the flow meter for easy cleaning or replacement. By mounting the strainer/flow corrector directly within the inlet of the flow meter housing itself, the problems associated with disconnecting the flow meter from its associated pipework and compression sealing between the flow meter inlet flange, as required by prior art type external strainers or flow correctors, is obviated. Also, since the strainer/flow corrector is mounted directly within the inlet portion of the flow meter housing, only a short straight piping run is required just ahead of the flow meter inlet to ensure non-turbulent fluid flow at a point where the fluid meets the strainer/flow corrector. This means that the strainer/flow corrector of the present invention can be used in conjunction with existing pipework which otherwise would not be suitable for flow correction due to space requirements and/or inlet piping configuration.

Advantageously, the fluid strainer/flow corrector of the present invention can be formed from a low-cost moldable synthetic polymer material such as polypropylene. For use with fluids which are reactive with plastics, a non-reactive material such as stainless steel can be used. The strainer/flow corrector can then be constructed by welding or brazing the annular ribs and radial ribs together and then joining the ends of the radial ribs to an annular flange formed from the same material.

BRIEF DESCRIPTION OF THE DRAWING FIGURES

These and other features and advantages of the present invention will now be described in the following detailed description of the preferred embodiment of the invention, when taken in conjunction with the accompanying drawing figures wherein.

DETAILED DESCRIPTION OF THE PREFERRED EMBODIMENT

Figure 1:
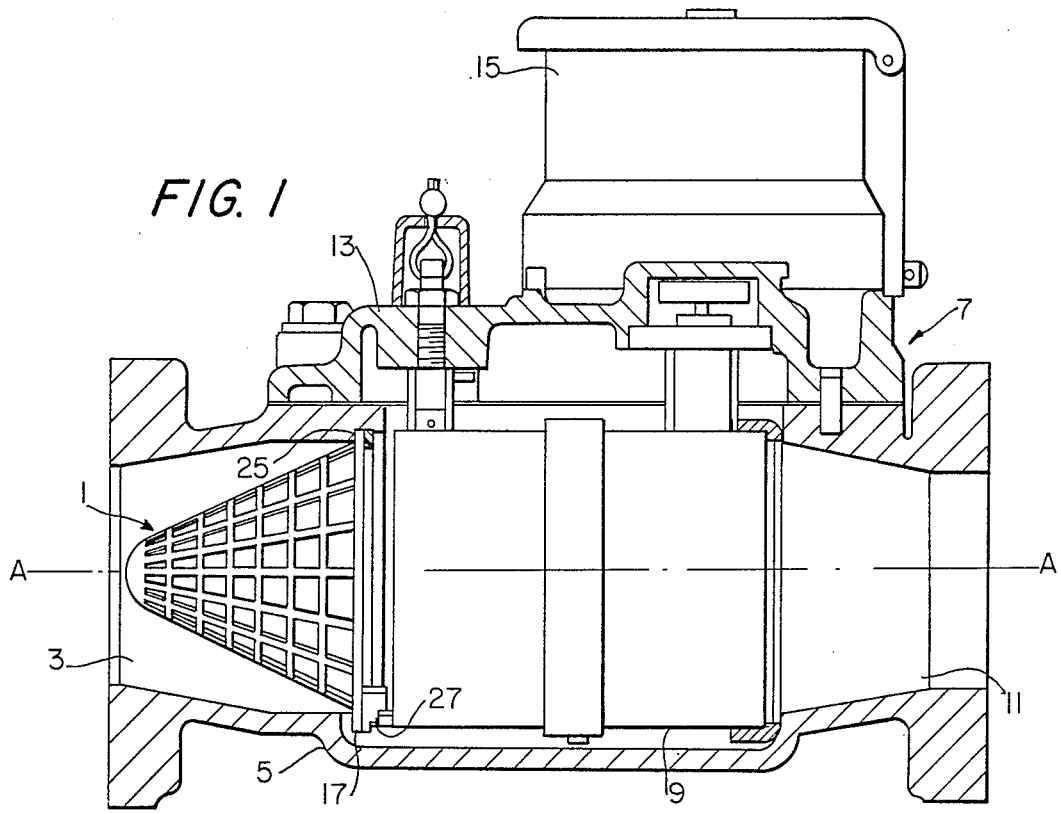
FIG. 1 is a side cross-sectional view of a fluid flow meter showing the mounting of a strainer/flow corrector in the inlet portion of the flow meter housing.

In FIG. 1, there is shown a combined fluid strainer and fluid flow correction device 1 (hereinafter called a "strainer/flow corrector" for brevity). Strainer/flow corrector 1 is mounted within inlet 3 of housing 5 of fluid flow measurement device 7.

Fluid flow measurement device 7 for example may be an axial-type turbine flow meter such as shown in U.S. Pat. No. 4,429,571. Such fluid flow measurement devices and their operation and construction are well known and will not be repeated in detail here. Such devices utilize a fluid flow measurement element (not shown) disposed within a fluid flow measurement chamber 9 formed within housing 5. Housing 5 is typically formed from bronze or cast iron, although many other types of material can also be used.

Housing 5 also includes a fluid outlet 11 connected to measurement chamber 9. In operation, fluid flows in a direction substantially parallel to axis A of FIG. 1 into inlet 3, past strainer/flow corrector 1, past the fluid flow measurement element disposed within measurement chamber 9, and then exits through outlet 11.

Housing 5 further includes a housing cover 13 which is bolted or otherwise secured to the upper side of measurement chamber 9, as shown in FIG. 1. The fluid flow measurement element is connected in a well-known fashion via a mechanical/magnetic linkage or other means to a register 15, also of well known and conventional design. Register 15 is mounted to a portion of housing cover 13.

Figure 2:
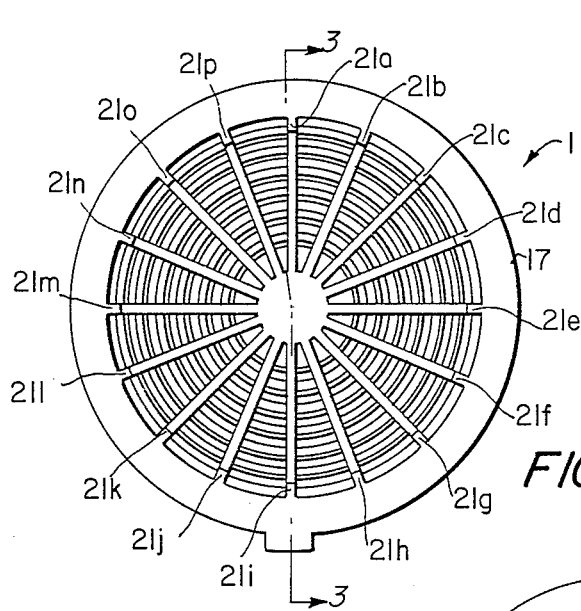
FIG. 2 is an elevation view of the strainer/flow corrector shown in FIG. 1 taken along a plane perpendicular to the longitudinal axis A of the inlet of the flow meter shown in FIG. 1 and slightly upstream of the inlet.
Figure 3:
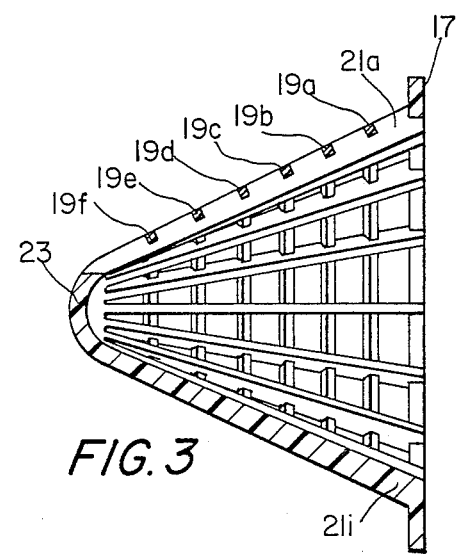
FIG. 3 is a cross sectional view of the strainer/flow corrector as shown in FIG. 2 taken along lines 3—3.

Turning now to FIGS. 2 and 3, the construction of strainer/flow corrector 1 is shown in more detail. Strainer/flow corrector 1 includes an annular flange portion 17 and a substantially conical ribbed portion connected to the flange portion with the ribbed portion comprised of a plurality of spaced-apart annular ribs 19a, 19b, . . . 19f, with the annular ribs being formed having successively smaller diameters at increasing longitudinal distances along axis A from annular flange portion 17. A plurality of spaced-apart radial support ribs 21a, 21b, 21c, . . . 21p each have one end connected to annular flange 17 and their other ends connected at an apex 23 of a cone whose side is defined by radial support ribs 21a–21p and whose base is defined by annular flange portion 17.

As shown in FIG. 3, the spacing between each of the annular ribs 19a–19f may be arranged so that the annular ribs are equidistant from each other. As shown in FIG. 2, this arrangement presents a frontal surface pattern in which the openings between annular ribs 19a–19f and their associated radial support ribs 21a–21p become progressively smaller as they approach apex 23 of strainer/flow corrector 1. This effectively slows the fluid moving closer to longitudinal axis A (see FIG. relative to the fluid moving closer to the wall of inlet 3. This results in correcting the fluid flow velocity profile of fluid entering inlet 3 to provide a more uniform distribution of fluid flow velocity downstream of strainer/flow corrector 1 with respect to a plane drawn perpendicular to axis A. Such a corrected fluid flow velocity profile enables a fluid flow measurement element disposed in measurement chamber 9 to more accurately measure the fluid flow velocity and/or volume more accurately.

In addition to acting as a fluid flow velocity corrector, the mesh- or grid-like openings formed by annular ribs 19a–19f and radial support ribs 21a–21p act to strain out stray particles and debris which might be present in fluid flowing into inlet 3 of fluid flow measurement device 7. As is well known, the presence of such particles or debris can disrupt and/or damage the sensitive fluid flow measurement element disposed in measurement chamber 9. The spacing between annular ribs 19a–19f and radial support ribs 21a–21p is chosen to be no greater than the size of debris which might be present in the fluid, thus trapping such debris on the outer surface of the strainer/flow corrector 1 before it can enter measurement chamber 9.

Strainer/flow corrector 1 is preferably formed from a synthetic polymer material such as polypropylene by molding or the like. Alternatively, if such a plastic material would be reactive with the fluid to be measured, a non-reactive material, e.g. stainless steel, can be substituted. Strainer/flow corrector 1 would then be constructed by welding or brazing annular ribs 19a–19f to radial support ribs 21a–21p. One end of each of the radial support ribs 21a–21p would then be welded to annular flange 17 (also formed from the same non-reactive material) and the other end of each of the support ribs 21a–21p would be welded or brazed together to form apex 23.

Figure 4A:
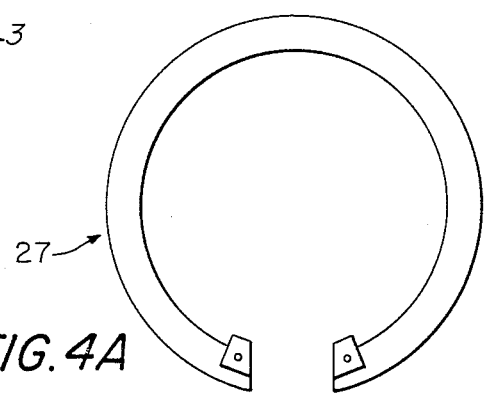
FIGS. 4a and 4b are front and side elevation views, respectively, of the snap-ring shown in FIG. 1.
Figure 4B:
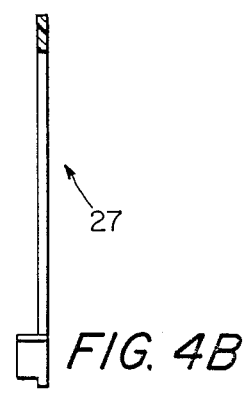

As shown in FIG. 1, strainer/flow corrector 1 is mounted within inlet 3 of housing 5 by means of an annular groove 25 machined within an inner wall of inlet 3 of housing 5. Flange 17 of strainer/flow corrector 1 is dimensioned to fit within groove 25. A flexible snap-ring 27 (see FIGS. 4a and 4b) is also dimensioned to fit within groove 25 and is seated securely adjacent to flange 17. Snap-ring 27 is formed from a suitable flexible plastic material such as the same material that strainer/flow corrector 1 is formed from. Alternatively, snap-ring 27 can be formed from other types of flexible, non-reactive materials such as stainless steel, etc.

It will be appreciated that the foregoing strainer/flow corrector design and mounting arrangement advantageously allows the strainer/flow corrector to be readily mounted and/or removed from housing 5 of the fluid flow measurement device 7 without the necessity of disconnecting inlet 3 from any upstream pipework which would otherwise be the case with prior art plate-type strainers or external flow correctors. In order to install, remove or replace strainer/flow corrector 1, housing cover 13 is unbolted from housing 5 exposing measurement chamber 9. Depending upon the type of flow measurement element used, the flow measurement element may or may not have to be removed from chamber 9. In order to install strainer/flow corrector 1, the strainer/flow corrector is inserted apex first through measurement chamber 9 after cover 13 has been removed and placed with flange 17 pressed into contact with groove 25. Snap-ring 27 is then introduced in the same manner and snap-fitted into groove 25 and adjacent to flange 17. Snap-ring 27 therefore holds flange 17 of strainer/flow corrector 1 snugly within groove 25. To remove or replace strainer/flow corrector 1, the above steps are reversed.

Thus the strainer/flow corrector of the present invention not only provides the dual capabilities of filtering out debris which would otherwise flow through a fluid measurement device and corrects the fluid flow velocity profile in a desired manner, but is also readily inserted and/or removed from the inlet portion of the fluid flow measurement device without requiring disconnection of the fluid flow measurement device from adjacent pipework. This means that the strainer/flow corrector may be regularly replaced and/or removed for cleaning in an easier fashion than that afforded by prior art devices.

While the present invention has been described in considerable detail, the foregoing is intended to be merely descriptive, but not limitive of the invention which is defined by the appended claims.

What is claimed is:

1. A fluid strainer and flow corrector for use with a fluid flow measurement device of the type including a housing having an inlet and an outlet connected to a conduit through which the fluid to be measured flows and a fluid measurement element disposed in the housing between the inlet and outlet for measuring a parameter of the fluid, the strainer/flow corrector comprising:
   an annular flange portion;
   a substantially conical ribbed portion connected to the flange portion, the ribbed portion comprising:
   (a) a plurality of spaced-apart annular ribs disposed substantially parallel to a plane containing the annular flange portion, the annular ribs being formed having successively smaller diameters at increasing longitudinal distances from the annular flange portion., and
   (b) a plurality of spaced-apart radial support ribs arranged about and each connected at one end to the annular flange and connected together at their other end at substantially an apex of a cone whose side is defined by the radial support ribs and whose base is defined by the annular flange portion;
   the fluid strainer/flow corrector being disposed in the inlet of the measurement device housing with said apex being disposed upstream of said flange portion with respect to the direction of fluid flow through the inlet.

2. The fluid strainer/flow corrector of claim 1 wherein the inlet of the housing has an annular groove formed therein for receiving the annular flange portion of the strainer/flow corrector, and further including a removable annular ring arranged in said groove adjacent to the annular flange portion of the strainer/flow corrector for holding the flange portion of the strainer/flow corrector in the groove.

3. The fluid strainer/flow corrector of claim 1 wherein the spacing between the annular ribs and radial support ribs is chosen to be no greater than the size of debris which might be present in said fluid.

4. The fluid strainer/flow corrector of claim 1 wherein the spacing between the annular ribs and radial support ribs and the thickness of the annular ribs and the radial support ribs is chosen to provide a desired velocity profile to fluid flowing past the fluid strainer/flow corrector.

* * * * *